(12) United States Patent
Zhang et al.

(10) Patent No.: US 10,922,834 B2
(45) Date of Patent: Feb. 16, 2021

(54) METHOD AND APPARATUS FOR DETERMINING VOLUME OF OBJECT

(71) Applicant: Hangzhou Hikrobot Technology Co., Ltd, Zhejiang (CN)

(72) Inventors: Wencong Zhang, Zhejiang (CN); Kuang Wu, Zhejiang (CN); Yonghua Jia, Zhejiang (CN)

(73) Assignee: Hangzhou Hikrobot Technology, Co., LTD

( * ) Notice: Subject to any disclaimer, the term of this patent is extended or adjusted under 35 U.S.C. 154(b) by 141 days.

(21) Appl. No.: 16/099,343

(22) PCT Filed: Mar. 30, 2017

(86) PCT No.: PCT/CN2017/078768
§ 371 (c)(1),
(2) Date: Nov. 6, 2018

(87) PCT Pub. No.: WO2017/197988
PCT Pub. Date: Nov. 23, 2017

(65) Prior Publication Data
US 2019/0139251 A1    May 9, 2019

(30) Foreign Application Priority Data
May 16, 2016 (CN) .......................... 2016 1 0323084

(51) Int. Cl.
*G06T 7/62* (2017.01)
*G06T 7/11* (2017.01)
(Continued)

(52) U.S. Cl.
CPC ................ *G06T 7/62* (2017.01); *G01B 11/00* (2013.01); *G06T 7/11* (2017.01); *G06T 7/13* (2017.01);
(Continued)

(58) Field of Classification Search
CPC . G06T 2207/30244; G06T 2207/10032; G06T 7/74; G06T 5/50; G06T 7/73; G06T 5/006; H04N 5/247; H04N 5/23238
See application file for complete search history.

(56) References Cited

U.S. PATENT DOCUMENTS

| | | | |
|---|---|---|---|
| 8,381,976 B2 | 2/2013 | Mohideen et al. | |
| 2011/0080475 A1* | 4/2011 | Lee | G06K 9/00355 348/77 |
| 2015/0302594 A1 | 10/2015 | Moore et al. | |

FOREIGN PATENT DOCUMENTS

| | | |
|---|---|---|
| CN | 101 846 503 A | 9/2010 |
| CN | 102564338 A | 7/2012 |

(Continued)

OTHER PUBLICATIONS

Greff et al., "A Comparison Between Background Subtraction Algorithms Using a Consumer Depth Camera", International Conference on Computer Vision Theory and Applications (VISAPP), 2012, 6 pages.

(Continued)

*Primary Examiner* — Marcos L Torres
(74) *Attorney, Agent, or Firm* — McDonnell Boehnen Hulbert & Berghoff LLP (57) ABSTRACT

A method for determining volume of an object includes: obtaining a target depth image containing a target object which is captured by a depth image capturing device (S101); performing segmentation based on depth data in the target depth image to obtain a target image region corresponding to the target object (S102); determining a target circumscribed rectangle that corresponds to the target image region and meets a predetermined condition (S103); determining volume of the target object based on the target circumscribed rectangle and the depth data of the target depth image (S104). Compared to the laser-based determination method (Continued)

in the prior art, this method employs a depth image capturing device without a laser measurement device, and thus the economic cost is lower. Further, compared to the manual scale-based determination method in the prior art, the method employs a software program to automatically determine volume without manual cooperation, and has a higher accuracy and efficiency. It can be seen that the present scheme achieves a high accuracy, a high efficiency and a lower economic cost in determining volume of the object. An apparatus for determining volume of an object is further provided.

12 Claims, 3 Drawing Sheets

(51) Int. Cl.
*G01B 11/00* (2006.01)
*G06T 7/136* (2017.01)
*G06T 7/55* (2017.01)
*G06T 7/13* (2017.01)

(52) U.S. Cl.
CPC ............... *G06T 7/136* (2017.01); *G06T 7/55* (2017.01); *G06T 2207/10028* (2013.01); *G06T 2207/20112* (2013.01); *G06T 2207/20224* (2013.01)

(56) References Cited

FOREIGN PATENT DOCUMENTS

| CN | 103983334 A | 8/2014 |
| CN | 104 330 038 A | 2/2015 |
| CN | 104330038 A * | 2/2015 |
| CN | 104517095 A | 4/2015 |
| CN | 204881572 U | 12/2015 |
| CN | 106839975 A | 6/2017 |
| WO | 2014/147863 A1 | 9/2014 |

OTHER PUBLICATIONS

International Search Report dated Jul. 4, 2017, issued in connection with International Application No. PCT/CN2017/078768, filed Mar. 30, 2017, 8 pages.

* cited by examiner

METHOD AND APPARATUS FOR DETERMINING VOLUME OF OBJECT

The present application is a US national phase under 35 U.S.C. § 371 of international application PCT/CN2017/078768, filed Mar. 30, 2017, which claims priority to a Chinese Patent Application No. 201610323084.1, filed with the State Intellectual Property Office of the People's Republic of China on May 16, 2016 and entitled "Object Volume Determination Method and Device", which is incorporated herein by reference in their entirety.

TECHNICAL FIELD

The present application relates to the technical field of machine vision, and in particular to a method and apparatus for determining volume of an object.

BACKGROUND

As the information about one of the most basic attributes of an object, volume data is widely used in production, logistics and the like, especially in volume-based logistics billing, automatic loading of an object, and so on. The object here means an object that is basically cuboid.

In the prior art, the common method for determining volume of an object includes a laser-based determination method and a manual scale-based determination method. The laser-based determination method achieves a high accuracy, but is not cost effective due to the need for expensive laser measurement devices, and thus is difficult to be widely used by users. The manual scale-based determination method requires manual cooperation and is susceptible to user's operation and emotion, and as a result, neither accuracy nor efficiency can be guaranteed.

SUMMARY

Embodiments of the present application aim to provide a method and apparatus for determining volume of an object, so as to achieve a high accuracy, a high efficiency and a lower economic cost in determining the volume of the object. The specific technical solutions are as follows.

In a first aspect, an embodiment of the present application provides a method for determining volume of an object. The method includes:

obtaining a target depth image containing a target object which is captured by a depth image capturing device;

performing segmentation based on depth data in the target depth image to obtain a target image region corresponding to the target object;

determining a target circumscribed rectangle that corresponds to the target image region and meets a predetermined condition; and determining volume of the target object based on the target circumscribed rectangle and the depth data of the target depth image.

Optionally, obtaining a target depth image containing a target object which is captured by a depth image capturing device, includes:

obtaining the target depth image containing the target object which is captured by a time-of-flight camera.

Optionally, performing segmentation based on depth data in the target depth image to obtain a target image region corresponding to the target object, includes:

performing segmentation based on the depth data in the target depth image using a depth image frame difference method to obtain the target image region corresponding to the target object.

Optionally, performing segmentation based on the depth data in the target depth image using a depth image frame difference method to obtain the target image region corresponding to the target object, includes:

obtaining a difference between the depth data of each of pixels in the target depth image and the depth data of a corresponding pixel in a predetermined background depth image; wherein the predetermined background depth image is an image of the background environment where the target object is located, which is captured in advance by the depth image capturing device and does not contain the target object;

generating a frame difference image corresponding to the target depth image based on the difference for each of the pixels;

binarizing the frame difference image; and obtaining the target image region corresponding to the target object from the binarized frame difference image.

Optionally, determining a target circumscribed rectangle that corresponds to the target image region and meets a predetermined condition, includes:

determining the target circumscribed rectangle that corresponds to the target image region and meets a predetermined condition by using a connected region analysis algorithm or an edge detection fitting algorithm.

Optionally, determining a target circumscribed rectangle that corresponds to the target image region and meets a predetermined condition, includes:

determining a target circumscribed rectangle that corresponds to the target image region and has a minimum area; or, determining a target circumscribed rectangle that corresponds to the target image region and has a minimum difference between its area and a predetermined area threshold.

Optionally, determining volume of the target object based on the target circumscribed rectangle and the depth data of the target depth image, includes:

extracting image coordinates of each vertex of the target circumscribed rectangle in the binarized frame difference image;

projecting the extracted image coordinates of each vertex into the target depth image to generate a reference point located in the target depth image;

calculating three-dimensional coordinates for each reference point in a camera world coordinate system according to a principle of perspective projection in camera imaging;

obtaining the volume of the target object by using the three-dimensional coordinates of the reference points and the depth data of the target depth image.

In a second aspect, an embodiment of the present application provides an apparatus for determining volume of an object. The apparatus includes:

a depth image obtaining module, configured for obtaining a target depth image containing a target object which is captured by a depth image capturing device;

an image region segmentation module, configured for performing segmentation based on depth data in the target depth image to obtain a target image region corresponding to the target object;

a circumscribed rectangle determination module, configured for determining a target circumscribed rectangle that corresponds to the target image region and meets a predetermined condition; and a volume determination module, configured for determining volume of the target object based on the target circumscribed rectangle.

Optionally, the depth image obtaining module includes:

a depth image obtaining unit, configured for obtaining the target depth image containing the target object which is captured by a time-of-flight camera.

Optionally, the image region segmentation module includes:

an image region segmentation unit, configured for performing segmentation based on the depth data in the target depth image using a depth image frame difference method to obtain the target image region corresponding to the target object.

Optionally, the image region segmentation unit includes:

a subtraction sub-unit, configured for obtaining a difference between the depth data of each of pixels in the target depth image and the depth data of a corresponding pixel in a predetermined background depth image; wherein the predetermined background depth image is an image of the background environment where the target object is located, which is captured in advance by the depth image capturing device and does not contain the target object;

a frame difference image generating sub-unit, configured for generating a frame difference image corresponding to the target depth image based on the difference for each of the pixels;

a binarization sub-unit, configured for binarizing the frame difference image; and an image region segmentation sub-unit, configured for obtaining the target image region corresponding to the target object from the binarized frame difference image.

Optionally, the circumscribed rectangle determination module includes:

a first circumscribed rectangle determination unit, configured for determining the target circumscribed rectangle that corresponds to the target image region and meets a predetermined condition by using a connected region analysis algorithm or an edge detection fitting algorithm.

Optionally, the circumscribed rectangle determination module includes:

a second circumscribed rectangle determination unit, configured for determining a target circumscribed rectangle that corresponds to the target image region and has a minimum area;

or, a third circumscribed rectangle determination unit, configured for determining a target circumscribed rectangle that corresponds to the target image region and has a minimum difference between its area and a predetermined area threshold.

Optionally, the volume determination module includes:

an image coordinate extracting unit, configured for extracting image coordinates of each vertex of the target circumscribed rectangle in the binarized frame difference image;

a reference point generating unit, configured for projecting the extracted image coordinates of each vertex into the target depth image to generate a reference point located in the target depth image;

a three-dimensional coordinate calculation unit, configured for calculating three-dimensional coordinates for each reference point in a camera world coordinate system according to a principle of perspective projection in camera imaging; and a volume determination unit, configured for obtaining the volume of the target object by using the three-dimensional coordinates of the reference points and the depth data of the target depth image.

In a third aspect, an embodiment of the present application provides a storage medium for storing executable program codes, which are executed to carry out the method for determining volume of an object in the embodiments of the present application.

In a fourth aspect, an embodiment of the present application provides an application program, which is executed to carry out the method for determining volume of an object in the embodiments of the present application.

In a fifth aspect, an embodiment of the present application provides an electronic device. The electronic device includes: a housing, a processor, a memory, a circuit board, and a power circuit. The circuit board is arranged inside a space surrounded by the housing. The processor and the memory are arranged on the circuit board. The power circuit is used for supplying power to various circuits or components. The memory is used for storing executable program codes. The processor carries out the method for determining volume of an object in the embodiments of the present application by executing the executable program codes stored in the memory.

In the embodiments of the present application, after obtaining a target depth image containing a target object which is captured by a depth image capturing device, the depth data of the target depth image is segmented to obtain a target image region corresponding to the target object. A target circumscribed rectangle that corresponds to the target image region is determined. The volume of the target object is determined based on the target circumscribed rectangle and the depth data of the target depth image. Compared to the laser-based determination method in the prior art, the present scheme employs a depth image capturing device without a laser measurement device, and thus the economic cost is lower. In addition, compared to the manual scale-based determination method in the prior art, the present scheme employs a software program to automatically determine volume without manual cooperation, leading to higher accuracy and efficiency. It can be seen that the present scheme determines the volume of the object in a high accuracy, high efficiency and cost effective manner.

BRIEF DESCRIPTION OF THE DRAWINGS

In order to more clearly describe the technical solutions of embodiments of the present application and the prior art, drawings used in the embodiments and the prior art will be briefly described below. Obviously, the drawings described below are for only some embodiments of the present application; those skilled in the art can obtain other drawings based on these drawings without any creative efforts.

DETAILED DESCRIPTION

The technical solutions of the embodiments of the application will be described clearly and completely below with reference to the accompanying drawings. Obviously, the embodiments described are merely some of the embodiments of the present application, not all of the embodiments. All other embodiments obtained by those skilled in the art based on the embodiments herein without any creative efforts shall fall within the protection scope of the application.

In order to solve the technical problem in the prior art, the embodiments of the present application provide a method and apparatus for determining volume of an object, so as to achieve a high accuracy, a high efficiency and a lower economic cost in determining volume of an object.

A method for determining volume of an object provided by an embodiment of the present application will be introduced below.

It should be noted that the method for determining volume of an object provided by the embodiment of the present application may be implemented by an apparatus for determining volume of an object. And in practical applications, the apparatus for determining volume of an object may be functional software arranged in a depth image capturing device, or may be functional software arranged in a backend server in communication with the depth image capturing device. In addition, the object whose volume is to be determined involved in the embodiment of the present application may be: an object, such as a workpiece or a package, having a shape of a basically cuboid in production and logistics.

Figure 1:
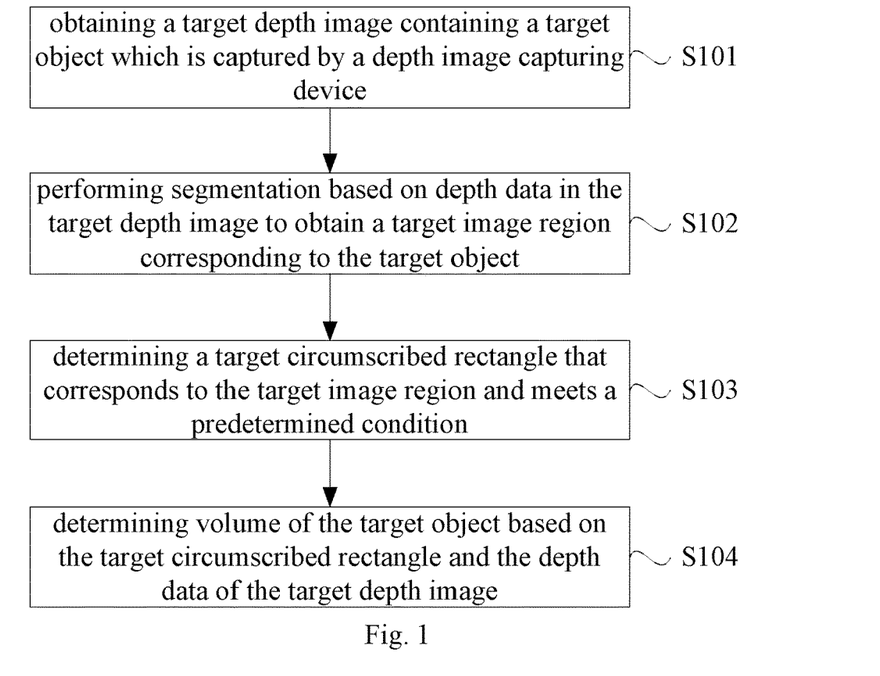
FIG. 1 is a flow chart of a method for determining volume of an object provided by an embodiment of the present application.

As shown in FIG. 1, the method for determining volume of an object provided by an embodiment of the present application, may include:

S101, obtaining a target depth image containing a target object which is captured by a depth image capturing device.

In the process of determining volume of a target object, the apparatus for determining volume of an object may first obtain a target depth image containing the target object which is captured by a depth image capturing device, and then perform subsequent processes using the obtained target depth image containing the target object. There may be at least one target object in one target depth image. It can be understood that, in a case where the apparatus for determining volume of an object is functional software in the depth image capturing device, this apparatus for determining volume of an object may directly obtain the target depth image captured by the depth image capturing device. In a case where the apparatus for determining volume of an object is functional software in a backend server, this apparatus for determining volume of an object may obtain the target depth image obtained by this backend server from the depth image capturing device, and the manner in which the backend server obtains the target depth image from the depth image capturing device may be active capturing or passive reception.

It should be noted that, in order to ensure that the depth image capturing device can capture the depth image of the target object, this depth image capturing device may be placed at a position where the depth data of the target object can be captured. In addition, the manner of capturing the target depth image may be a triggered capture manner. The triggered capture manner may be that capturing the depth image is triggered only when a target object to be measured appears in the scene. For example, the manner of triggering a capture may include a manner in which the capture is externally and physically triggered by a photoelectric signal or a manner in which the capture is automatically triggered through intelligent analysis. The manner in which the capture is externally and physically triggered by a photoelectric signal specifically means that a photoelectric signal is interrupted when a target object whose volume needs to be determined passes, and thereby a trigger signal is transmitted to the depth image capturing device. The manner in which the capture is automatically triggered through intelligent analysis means that an automatic detection is performed using a motion detection algorithm to determine whether the target object appears, and then the depth image capturing device can capture the target depth image of the target object when the determination result indicates that it appears.

Specifically, in an implementation, the depth image capturing device may be a TOF (Time-of-Flight) camera. In this case, obtaining a target depth image containing a target object which is captured by a depth image capturing device, may include: obtaining the target depth image containing the target object which is captured by the TOF (Time-of-Flight) camera. The principle of the TOF camera capturing a depth image is to continuously transmit a light pulse to the target object, receive light returned from the target object using a sensor, and detect the flight time of the light pulse and obtain the distance to the target object. Of course, the depth image capturing device is not limited to the TOF camera. Other devices that may capture the depth image may also be used as the depth image capturing device used in the embodiment of the present application.

For better understanding of the embodiment of the present application, the depth of the image will be introduced now. A picture is composed of pixels. All the pixels of different colors constitute an entire image. The image is stored in a computer in binary. If 1 bit is used for storage, that is, a pixel is stored with one bit, then this pixel has a value of 0 or 1, and the picture is thus either black or white. If 4 bits are used for storage, then this pixel has a value range from 0 to $2^4$. If 8 bits are used for storage, this pixel has a value range from 0 to $2^8$, and so on. In the prior art, the number of bits used by the computer to store a single pixel is called the depth of an image, and the depth image is a picture that can reflect the depth of the picture.

It should be noted that the specific implementation of obtaining the target depth image containing the target object which is captured by the depth image capturing device above is only an example and should not be construed as a limitation to the embodiment of the present application.

S102, performing segmentation based on depth data in the target depth image to obtain a target image region corresponding to the target object.

To determine the volume of the target object, after obtaining the target depth image containing the target object, the depth data of the target depth image may be segmented to obtain the target image region corresponding to the target object.

Specifically, in an implementation, performing segmentation based on depth data in the target depth image to obtain the target image region corresponding to the target object, may include:

performing segmentation based on the depth data in the target depth image using a depth image frame difference method to obtain the target image region corresponding to the target object.

It should be noted that the specific implementation of performing segmentation based on depth data in the target depth image to obtain the target image region corresponding to the target object is only an example and should not be construed as a limitation to the embodiment of the present application. In addition, for a clear layout, the specific implementation of performing segmentation based on the depth data in the target depth image using the depth image frame difference method to obtain the target image region corresponding to the target object will be explained subsequently.

S103, determining a target circumscribed rectangle that corresponds to the target image region and meets a predetermined condition.

After the segmentation for obtaining the target image region corresponding to the target object, in order to determine volume of the target object, a target circumscribed rectangle that corresponds to the target image region and meets a predetermined condition may be determined, and subsequent processes are then performed based on the target circumscribed rectangle.

It can be understood that, in practical applications, a target circumscribed rectangle that corresponds to the target image region and meets a predetermined condition may be determined by a connected region analysis algorithm or an edge detection fitting algorithm without being limited thereto. Specifically, the basic principle of the connected region analysis algorithm is that: the connected regions in the binarized image are marked, the convex hull of each of the connected regions is calculated, and the minimum circumscribed rectangle corresponding to the target object is calculated using the feature of the circumscribed rectangle, having a minimum area, of the convex hull. The feature is that one edge of the convex hull coincides with one edge of the circumscribed rectangle and each edge of the rectangle must contain a vertex of the convex hull. The convex hull is an existing basic concept in computational geometry and is the smallest convex polygon that contains the set of all points in this connected region. The basic principle of the so-called edge detection fitting algorithm is that: the edges of each target image region are fitted using a straight line fitting method, and the circumscribed rectangle of the target image region is calculated according to an edge straight line equation. The straight line fitting method is a common method in the prior art, and mainly includes Hough transform and least-squares fitting. Specifically, the Hough transform is a parameter estimation technique using a voting strategy. The principle is to convert a detection problem in an image space into a parameter space using the point-line duality between the image space and the Hough parameter space. The least-squares fitting is defined as that: (xi)2 is the minimum, and the fitting function defined by the standard ni=1 is called the least-squares fitting, which is the best squares approximation in the discrete case. For the given data points $\{(Xi, Yi)\}(i=0, 1, \ldots, m)$, in a given function class $\Phi$, the least-squares fitting finds $p(x) \in \Phi$ that minimizes the sum $E^2$ of squares of errors, where $E^2 = \Sigma[p(Xi) - Yi]^2$. Further, from a geometrical point of view, it is to find the curve $y=p(x)$, to which the sum of squares of the distances from the given points $\{(Xi, Yi)\}(i=0, 1, \ldots, m)$ is the least. The function $p(x)$ is called a fitting function or a least-squares solution. The method for finding the fitting function $p(x)$ is called the least-squares method of curve fitting.

In addition, it should be noted that there may be multiple target circumscribed rectangles corresponding to the target image region. One target circumscribed rectangle meeting a predetermined condition may be obtained from the multiple target circumscribed rectangles, and then the subsequent process of determining volume is performed based on the obtained target circumscribed rectangle meeting the predetermined condition. Based on the above requirements, determining a target circumscribed rectangle that corresponds to the target image region and meets the predetermined condition may include: determining a target circumscribed rectangle that corresponds to the target image region and has a minimum area;

or, determining a target circumscribed rectangle that corresponds to the target image region and has a minimum difference between its area and a predetermined area threshold.

The target circumscribed rectangle having a minimum area is the circumscribed rectangle that best fits the edges of the target image region, and therefore may be used for the subsequent process of determining the volume. The target circumscribed rectangle having a minimum difference between its area and the predetermined area threshold is a circumscribed rectangle with the minimum error from the reference circumscribed rectangle, and therefore may also be used for subsequent process of determining the volume. The area of the reference circumscribed rectangle equals to the predetermined area threshold.

It should be noted that the above specific implementation of determining a target circumscribed rectangle that corresponds to the target image region and meets the predetermined condition is only an example and should not be construed as a limitation to the embodiment of the present application.

S104, determining volume of the target object based on the target circumscribed rectangle and the depth data of the target depth image.

After the target circumscribed rectangle is determined, the volume of the target object may be determined by a specific process based on the target circumscribed rectangle and the depth data in the target depth image.

It should be noted that there are various implementations of determining the volume of the target object based on the target circumscribed rectangle and the depth data in the target depth image. For the clarity of the solution and the layout, the specific implementation of determining volume of the target object based on the target circumscribed rectangle and the depth data in the target depth image will be introduced subsequently by way of example.

In the embodiment of the present application, after obtaining a target depth image containing a target object which is captured by a depth image capturing device, the depth data in the target depth image is segmented to obtain a target image region corresponding to the target object; a target circumscribed rectangle that corresponds to the target image region and meets a predetermined condition is determined; and the volume of the target object is determined based on the target circumscribed rectangle and the depth data in the target depth image. Compared to the laser-based determination method in the prior art, the present scheme employs a depth image capturing device without a laser measurement device, and thus the economic cost is lower. In addition, compared to the manual scale-based determination method in the prior art, the present scheme employs a software program to automatically determine volume without user's cooperation, and thus has higher accuracy and efficiency. It can be seen that the present scheme achieves a high accuracy, a high efficiency and a lower economic cost in determining volume of an object.

The specific implementation of performing segmentation based on the depth data in the target depth image using a depth image frame difference method to obtain the target image region corresponding to the target object will be described in detail below.

Figure 2:
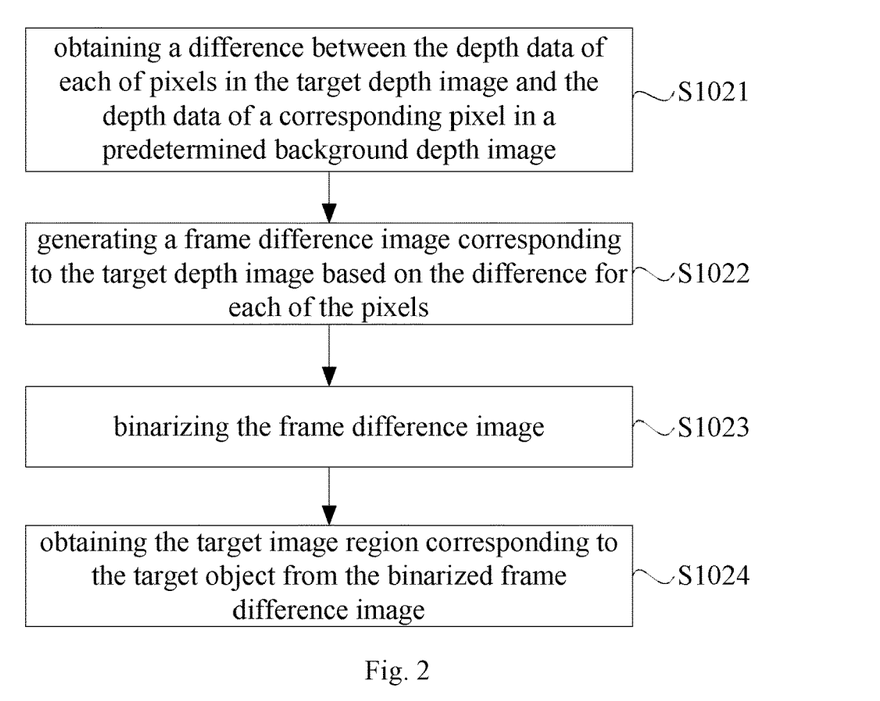
FIG. 2 is another flow chart of a method for determining volume of an object provided by an embodiment of the present application.

As shown in FIG. 2, performing segmentation based on the depth data in the target depth image using a depth image frame difference method to obtain a target image region corresponding to the target object (S102) may include:

S1021, obtaining a difference between the depth data of each of pixels in the target depth image and the depth data of a corresponding pixel in a predetermined background depth image.

The predetermined background depth image is an image of the background environment where the target object is located, which is captured in advance by a depth image capturing device and does not contain the target object.

S1022, generating a frame difference image corresponding to the target depth image based on the difference for each of the pixels.

S1023, binarizing the frame difference image.

S1024, obtaining the target image region corresponding to the target object from the binarized frame difference image.

Specifically, obtaining a difference between the depth data of each of pixels in the target depth image and the depth data of a corresponding pixel in the predetermined background depth image means: for each pixel in the target depth image, obtaining the difference between the depth data of the pixel and the depth data of a corresponding pixel in the predetermined background depth image. For example, obtaining the difference between the pixel 1 in the target depth image and the corresponding pixel 2 in the predetermined background depth image may be: subtracting the value of the corresponding pixel 2 from the value of the pixel 1.

Specifically, assuming that the two values of the binarization are 0 and 1, binarizing the frame difference image is: comparing the absolute value of each of the pixels in the frame difference image with a predetermined threshold, and if the absolute value is greater than the threshold, changing the pixel value of the pixel into 1, otherwise, changing the pixel value of the pixel into 0. Alternatively, if the absolute value is greater than the threshold, the pixel value of the pixel may be changed into 0, otherwise, the pixel value of the pixel may be changed into 1. Through such processes, the pixel value of each pixel in the target image region, corresponding to the target object, in the frame difference image is different from the pixel value of each pixel outside the target image region. The target image region corresponding to this target object can then be obtained from the binarized frame difference image. Of course, the two values of the binarization may also be 0 and 255. In this case, the specific process of binarizing the frame difference image is similar to that described with respect to the values of 0 and 1, and will not be described again.

The specific implementation of determining volume of the target object based on the target circumscribed rectangle and the depth data of the target depth image will be explained below by way of example. Of course, this specific implementation is only an example and should not be construed as a limitation to the embodiment of the present application.

Figure 3:
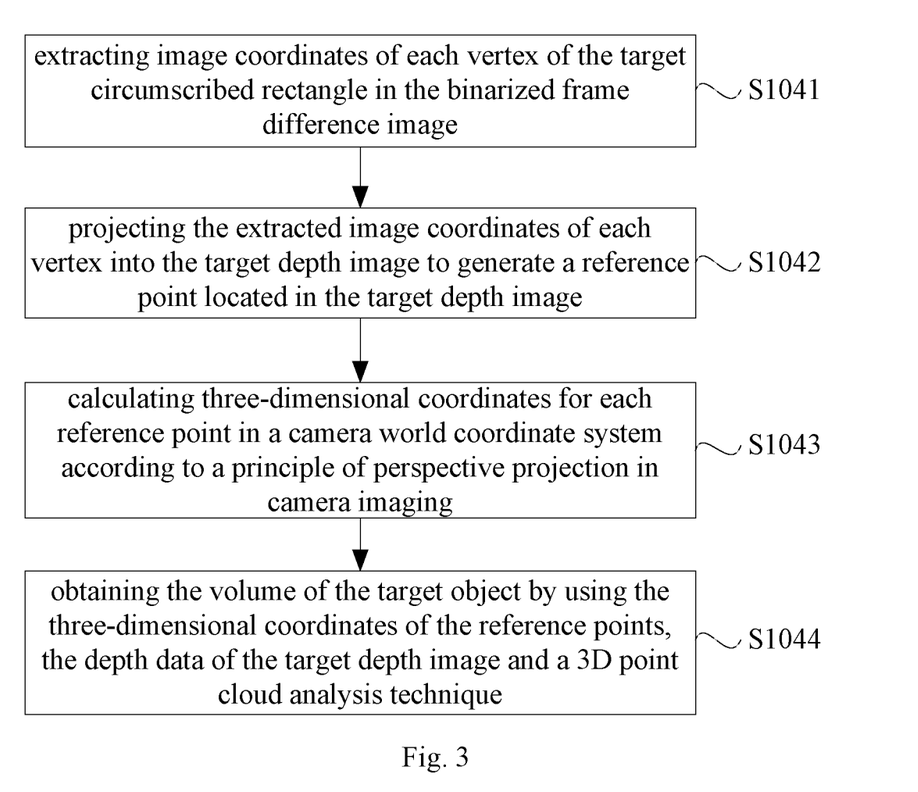
FIG. 3 is another flow chart of a method for determining volume of an object provided by an embodiment of the present application.

As shown in FIG. 3, determining volume of the target object based on the target circumscribed rectangle and the depth data of the target depth image may include:

S1041, extracting image coordinates of each vertex of the target circumscribed rectangle in the binarized frame difference image;

S1042, projecting the extracted image coordinates of each vertex into the target depth image to generate a reference point located in the target depth image;

S1043, calculating three-dimensional coordinates for each reference point in a camera world coordinate system according to a principle of perspective projection in camera imaging; and S1044, obtaining the volume of the target object by using the three-dimensional coordinates of the reference points and the depth data of the target depth image.

It can be understood that the frame difference image corresponds to a two-dimensional coordinate system, and therefore, the image coordinates of each vertex of the target circumscribed rectangle in the binarized frame difference image may be extracted. In addition, since the frame difference image is determined based on the target depth image, the dimension of the frame difference image is the same as that of the target depth image, and the two-dimensional coordinate system for the frame difference image is thus the same as that for the target depth image. Therefore, the image coordinates of a reference point located in the target depth image are the same as the image coordinates of a corresponding vertex located in the binarized frame difference image.

Technologies in prior art may be used to calculate three-dimensional coordinates for each reference point in a camera world coordinate system according to the principle of perspective projection in camera imaging, and will not be described herein.

The specific implementation of obtaining the volume of the target object by using the three-dimensional coordinates of the reference points and the depth data of the target depth image may include: calculating Euclidean distances between every two of 4 reference points; determining the length and width of the target object based on the calculated Euclidean distances; subtracting the Z value of the target object from the Z value corresponding to the predetermined background depth image, to obtain the height of the target object; and determining the product of the determined length, width and height of the target object as the volume of the target object. The Z value of the target object is the Z value of a region corresponding to the four reference points, i.e., the depth value. The Z value corresponding to the predetermined background depth image is a depth value. It should be noted that since the pattern formed by the four reference points as the vertexes is a rectangle, lines between every two of the four reference points includes the diagonal lines of the rectangle. That is, the Euclidean distance between reference points at two ends of each diagonal line is included in the Euclidean distances between every two of the four reference points. For this reason, when determining the length and width of the target object based on the calculated Euclidean distances, the Euclidean distance between reference points at two ends of each diagonal line should be removed firstly, that is, the maximum Euclidean distances are removed. The remaining Euclidean distances are determined as the length and width of the target object.

Of course, in calculating the length and width of the target object, one reference point may alternatively be selected as the target reference point. The Euclidean distances between the target reference point and the other three reference points are calculated. The two Euclidean distances whose values are smaller are determined as the length and width of the target object.

Figure 4:
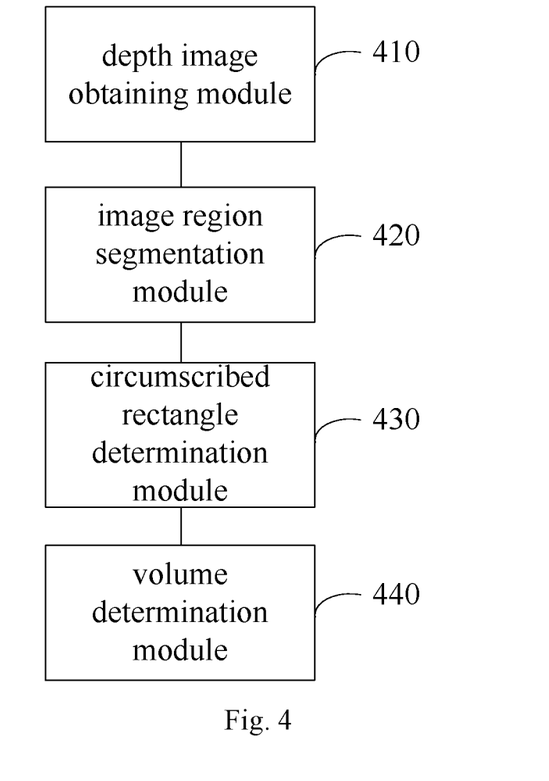
FIG. 4 is a schematic diagram of the structure of an apparatus for determining volume of an object provided by an embodiment of the present application.

Corresponding to the above method embodiment, an embodiment of the present application further provides an apparatus for determining volume of an object. As shown in FIG. 4, the apparatus may include:

a depth image obtaining module 410, configured for obtaining a target depth image containing a target object which is captured by a depth image capturing device;

an image region segmentation module 420, configured for performing segmentation based on depth data in the target depth image to obtain a target image region corresponding to the target object;

a circumscribed rectangle determination module 430, configured for determining a target circumscribed rectangle that corresponds to the target image region and meets a predetermined condition; and a volume determination module 440, configured for determining volume of the target object based on the target circumscribed rectangle and the depth data in the target depth image.

In the embodiment of the present application, after obtaining the target depth image containing the target object which is captured by a depth image capturing device, the depth data in the target depth image is segmented to obtain a target image region corresponding to the target object. A target circumscribed rectangle that corresponds to the target image region and meets a predetermined condition is determined. The volume of the target object is then determined based on the target circumscribed rectangle and the depth data of this target depth image. Compared to the laser-based determination method in the prior art, the present scheme employs a depth image capturing device without a laser measurement device, and thus the economic cost is lower. In addition, compared to the manual scale-based determination method in the prior art, the present scheme employs a software program to automatically determine volume without manual cooperation, and has a higher accuracy and efficiency. It can be seen that the present scheme achieves a high accuracy, a high efficiency and a lower economic cost in determining volume of an object.

The depth image obtaining module 410 may include:
a depth image obtaining unit, configured for obtaining the target depth image containing the target object which is captured by a time-of-flight camera.

The image region segmentation module 420 may include:
an image region segmentation unit, configured for performing segmentation based on the depth data in the target depth image using a depth image frame difference method to obtain the target image region corresponding to the target object.

Further, specifically, the image region segmentation unit may include:
a subtraction sub-unit, configured for obtaining a difference between the depth data of each of pixels in the target depth image and the depth data of a corresponding pixel in a predetermined background depth image; wherein the predetermined background depth image is an image of the background environment where the target object is located, which is captured in advance by the depth image capturing device and does not contain the target object;

a frame difference image generating sub-unit, configured for generating a frame difference image corresponding to the target depth image based on the difference for each of the pixels;

a binarization sub-unit, configured for binarizing the frame difference image; and an image region segmentation sub-unit, configured for obtaining the target image region corresponding to the target object from the binarized frame difference image.

The circumscribed rectangle determination module 430 may include:
a first circumscribed rectangle determination unit, configured for determining the target circumscribed rectangle that corresponds to the target image region and meets a predetermined condition by using a connected region analysis algorithm or an edge detection fitting algorithm.

The circumscribed rectangle determination module 430 may include:
a second circumscribed rectangle determination unit, configured for determining a target circumscribed rectangle that corresponds to the target image region and has a minimum area;

or, a third circumscribed rectangle determination unit, configured for determining a target circumscribed rectangle that corresponds to the target image region and has a minimum difference between its area and a predetermined area threshold.

The volume determination module 440 may include:
an image coordinate extracting unit, configured for extracting image coordinates of each vertex of the target circumscribed rectangle in the binarized frame difference image;

a reference point generating unit, configured for projecting the extracted image coordinates of each vertex into the target depth image to generate a reference point located in the target depth image;

a three-dimensional coordinate calculation unit, configured for calculating three-dimensional coordinates for each reference point in a camera world coordinate system according to a principle of perspective projection in camera imaging;

a volume determination unit, configured for obtaining the volume of the target object by using the three-dimensional coordinates of the reference points and the depth data of the target depth image.

Corresponding to the above method embodiment, an embodiment of the present application further provides a storage medium storing executable program codes, which are executed to carry out the method for determining volume of an object provided by the embodiments of the present application. Specifically, the method for determining volume of an object may include:

obtaining a target depth image containing a target object which is captured by a depth image capturing device;

performing segmentation based on depth data in the target depth image to obtain a target image region corresponding to the target object;

determining a target circumscribed rectangle that corresponds to the target image region and meets a predetermined condition; and determining volume of the target object based on the target circumscribed rectangle and the depth data of the target depth image.

Optionally, obtaining a target depth image containing a target object which is captured by a depth image capturing device, includes:

obtaining the target depth image containing the target object which is captured by a time-of-flight camera.

Optionally, performing segmentation based on depth data in the target depth image to obtain a target image region corresponding to the target object, includes:

performing segmentation based on the depth data in the target depth image using a depth image frame difference method to obtain the target image region corresponding to the target object;

Optionally, performing segmentation based on the depth data in the target depth image using a depth image frame difference method to obtain the target image region corresponding to the target object, includes:

obtaining a difference between the depth data of each of pixels in the target depth image and the depth data of a corresponding pixel in a predetermined background depth image; wherein the predetermined background depth image is an image of the background environment where the target object is located, which is captured in advance by the depth image capturing device and does not contain the target object;

generating a frame difference image corresponding to the target depth image based on the difference for each of the pixels;

binarizing the frame difference image; and obtaining the target image region corresponding to the target object from the binarized frame difference image.

Optionally, determining a target circumscribed rectangle that corresponds to the target image region and meets a predetermined condition, includes:

determining the target circumscribed rectangle that corresponds to the target image region and meets a predetermined condition by using a connected region analysis algorithm or an edge detection fitting algorithm.

Optionally, determining a target circumscribed rectangle that corresponds to the target image region and meets a predetermined condition, includes:

determining a target circumscribed rectangle that corresponds to the target image region and has a minimum area; or, determining a target circumscribed rectangle that corresponds to the target image region and has a minimum difference between its area and a predetermined area threshold.

Optionally, determining volume of the target object based on the target circumscribed rectangle and the depth data of the target depth image, includes:

extracting image coordinates of each vertex of the target circumscribed rectangle in the binarized frame difference image;

projecting the extracted image coordinates of each vertex into the target depth image to generate a reference point located in the target depth image;

calculating three-dimensional coordinates for each reference point in a camera world coordinate system according to a principle of perspective projection in camera imaging; and obtaining the volume of the target object by using the three-dimensional coordinates of the reference points and the depth data of the target depth image.

In this embodiment, the storage medium stores the executable codes, which is executed to carry out the method for determining volume of an object provided by the embodiments of the present application, thereby being capable of achieving a high accuracy, a high efficiency and a lower economic cost in determining volume of an object.

Corresponding to the above method embodiment, an embodiment of the present application further provides an application program, which is executed to carry out the method for determining volume of an object provided by the embodiments of the present application. Specifically, the method for determining volume of an object may include:

obtaining a target depth image containing a target object which is captured by a depth image capturing device;

performing segmentation based on depth data in the target depth image to obtain a target image region corresponding to the target object;

determining a target circumscribed rectangle that corresponds to the target image region and meets a predetermined condition; and determining volume of the target object based on the target circumscribed rectangle and the depth data of the target depth image.

Optionally, obtaining a target depth image containing a target object which is captured by a depth image capturing device, includes:

obtaining the target depth image containing the target object which is captured by a time-of-flight camera.

Optionally, performing segmentation based on depth data in the target depth image to obtain a target image region corresponding to the target object, includes:

performing segmentation based on the depth data in the target depth image using a depth image frame difference method to obtain the target image region corresponding to the target object.

Optionally, performing segmentation based on the depth data in the target depth image using a depth image frame difference method to obtain the target image region corresponding to the target object, includes:

obtaining a difference between the depth data of each of pixels in the target depth image and the depth data of a corresponding pixel in a predetermined background depth image; wherein the predetermined background depth image is an image of the background environment where the target object is located, which is captured in advance by the depth image capturing device and does not contain the target object;

generating a frame difference image corresponding to the target depth image based on the difference for each of the pixels;

binarizing the frame difference image; and obtaining the target image region corresponding to the target object from the binarized frame difference image.

Optionally, determining a target circumscribed rectangle that corresponds to the target image region and meets a predetermined condition, includes:

determining the target circumscribed rectangle that corresponds to the target image region and meets a predetermined condition by using a connected region analysis algorithm or an edge detection fitting algorithm.

Optionally, determining a target circumscribed rectangle that corresponds to the target image region and meets a predetermined condition, includes:

determining a target circumscribed rectangle that corresponds to the target image region and has a minimum area; or, determining a target circumscribed rectangle that corresponds to the target image region and has a minimum difference between its area and a predetermined area threshold.

Optionally, determining volume of the target object based on the target circumscribed rectangle and the depth data of the target depth image, includes:

extracting image coordinates of each vertex of the target circumscribed rectangle in the binarized frame difference image;

projecting the extracted image coordinates of each vertex into the target depth image to generate a reference point located in the target depth image;

calculating three-dimensional coordinates for each reference point in a camera world coordinate system according to a principle of perspective projection in camera imaging; and obtaining the volume of the target object by using the three-dimensional coordinates of the reference points and the depth data of the target depth image.

In this embodiment, the application program, when executed, carries out the method for determining volume of an object provided by the embodiments of the present application, thereby being capable of achieving a high accuracy, a high efficiency and a lower economic cost in determining volume of an object.

Figure 5:
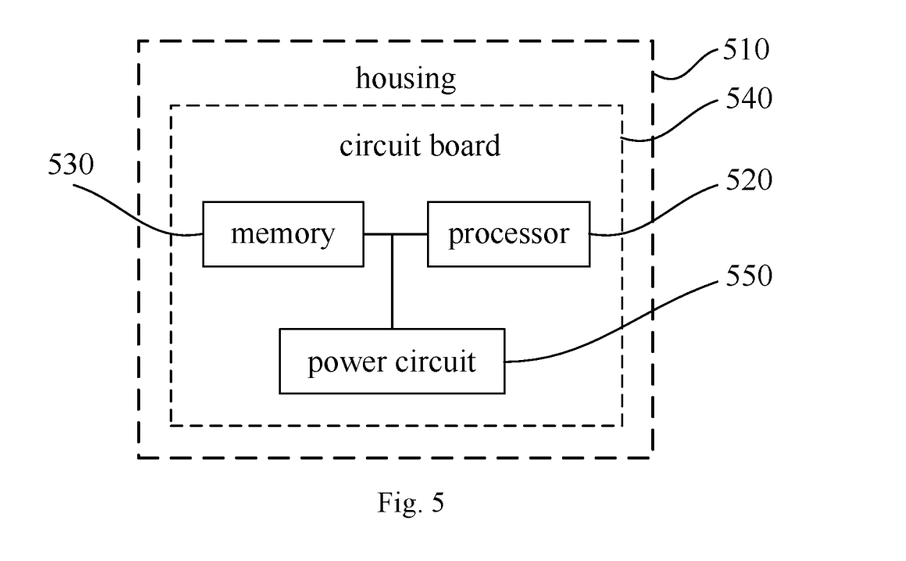
FIG. 5 is a schematic diagram of the structure of an electronic device provided by an embodiment of the present application.

Corresponding to the above method embodiment, an embodiment of the present application further provides an electronic device. The electronic device includes: a housing 510, a processor 520, a memory 530, a circuit board 540, and a power circuit 550. The circuit board 550 is arranged inside a space surrounded by the housing 510. The processor 520 and the memory 530 are arranged on the circuit board 540. The power circuit 540 is used for supplying power to various circuits or components. The memory 530 is used for storing executable program codes. The processor 520 carries out the method for determining volume of an object provided by the embodiments of the present application by executing the executable program codes stored in the memory. The method for determining volume of an object may include:

obtaining a target depth image containing a target object which is captured by a depth image capturing device;

performing segmentation based on depth data in the target depth image to obtain a target image region corresponding to the target object;

determining a target circumscribed rectangle that corresponds to the target image region and meets a predetermined condition; and determining volume of the target object based on the target circumscribed rectangle and the depth data of the target depth image.

The electronic device may be a depth image capturing device or a backend server in communication with the depth image capturing device.

Optionally, obtaining a target depth image containing a target object which is captured by a depth image capturing device, includes:

obtaining the target depth image containing the target object which is captured by a time-of-flight camera.

Optionally, performing segmentation based on depth data in the target depth image to obtain a target image region corresponding to the target object, includes:

performing segmentation based on the depth data in the target depth image using a depth image frame difference method to obtain the target image region corresponding to the target object;

Optionally, performing segmentation based on the depth data in the target depth image using a depth image frame difference method to obtain the target image region corresponding to the target object, includes:

obtaining a difference between the depth data of each of pixels in the target depth image and the depth data of a corresponding pixel in a predetermined background depth image; wherein the predetermined background depth image is an image of the background environment where the target object is located, which is captured in advance by the depth image capturing device and does not contain the target object;

generating a frame difference image corresponding to the target depth image based on the difference for each of the pixels;

binarizing the frame difference image; and obtaining the target image region corresponding to the target object from the binarized frame difference image.

Optionally, determining a target circumscribed rectangle that corresponds to the target image region and meets a predetermined condition, includes:

determining the target circumscribed rectangle that corresponds to the target image region and meets a predetermined condition by using a connected region analysis algorithm or an edge detection fitting algorithm.

Optionally, determining a target circumscribed rectangle that corresponds to the target image region and meets a predetermined condition, includes:

determining a target circumscribed rectangle that corresponds to the target image region and has a minimum area; or, determining a target circumscribed rectangle that corresponds to the target image region and has a minimum difference between its area and a predetermined area threshold.

Optionally, determining volume of the target object based on the target circumscribed rectangle and the depth data of the target depth image, includes:

extracting image coordinates of each vertex of the target circumscribed rectangle in the binarized frame difference image;

projecting the extracted image coordinates of each vertex into the target depth image to generate a reference point located in the target depth image;

calculating three-dimensional coordinates for each reference point in a camera world coordinate system according to a principle of perspective projection in camera imaging; and obtaining the volume of the target object by using the three-dimensional coordinates of the reference points and the depth data of the target depth image.

In this embodiment, the processor of the electronic device reads the executable program codes stored in the memory and then carries out a program corresponding to the executable program codes. The program, when being executed, carries out the method for determining volume of an object provided by the embodiments of the present application, thereby achieving a high accuracy, a high efficiency and a lower economic cost in determining volume of the object.

It should be emphasized that the embodiments of the electronic device, the application program and the storage medium are described briefly, since the operations involved therein are substantially similar to the foregoing embodiments of the method. The related contents can refer to the description of the embodiments of the method.

It should be noted that the relationship terms used herein, such as "first", "second" and the like are only used to distinguish one entity or operation from another entity or operation, but do not necessarily require or imply that there is an actual relationship or order between these entities or operations. Moreover, the terms "include", "comprise", or any variants thereof are intended to cover a non-exclusive inclusion, such that processes, methods, articles, or devices, including a series of elements, include not only those elements that have been listed, but also other elements that is not specifically listed or the elements intrinsic to these processes, methods, articles, or devices. Without further limitations, elements defined by the wording "comprise(s)

a/an . . . " do not exclude additional identical elements in the processes, methods, articles, or devices that includes the listed elements.

All of the embodiments herein are described in a correlated manner, and identical or similar parts in the embodiments can refer to one another. In addition, the description for each embodiment focuses on the differences from other embodiments. In particular, the embodiment of the device is described briefly, since it is substantially similar to the embodiment of the method, and the related contents can refer to the description of the embodiment of the method.

The embodiments described above are simply preferred embodiments of the present application, and are not intended to limit the scope of protection of the present application. Any modifications, alternatives, improvements, or the like within the spirit and principle of the present application shall be included in the scope of protection of the present application.

The invention claimed is:

1. A method for determining volume of an object, comprising:
obtaining a target depth image containing a target object which is captured by a depth image capturing device;
performing segmentation based on depth data in the target depth image to obtain a target image region corresponding to the target object;
determining a target circumscribed rectangle that corresponds to the target image region and meets a predetermined condition, which comprises: determining a target circumscribed rectangle that corresponds to the target image region and has a minimum area, or, determining a target circumscribed rectangle that corresponds to the target image region and has a minimum difference between its area and a predetermined area threshold;
extracting image coordinates of each vertex of the target circumscribed rectangle in a binarized frame difference image, wherein the frame difference image is an image that is obtained based on the difference between the depth data of the target depth image and depth data of a predetermined background depth image,
projecting the extracted image coordinates of each vertex into the target depth image to generate a reference point located in the target depth image;
calculating three-dimensional coordinates for each reference point in a camera world coordinate system according to a principle of perspective projection in camera imaging; and
with the three-dimensional coordinates of the reference points, calculating Euclidean distance between every two of the reference points, determining a length and a width of the target object as two distances other than the longest distance in the calculated Euclidean distances, subtracting a depth value of a region corresponding to the reference points from a depth value of the predetermined background depth image to obtain a height of the target object, and determining a volume of the target object as the product of the length, width and height of the target object.

2. The method of claim 1, wherein obtaining a target depth image containing a target object which is captured by a depth image capturing device, comprises:
obtaining the target depth image containing the target object which is captured by a time-of-flight camera.

3. The method of claim 1, wherein performing segmentation based on depth data in the target depth image to obtain a target image region corresponding to the target object, comprises:
performing segmentation based on the depth data in the target depth image using a depth image frame difference method to obtain the target image region corresponding to the target object.

4. The method of claim 3, wherein performing segmentation based on the depth data in the target depth image using a depth image frame difference method to obtain the target image region corresponding to the target object, comprises:
obtaining a difference between the depth data of each of pixels in the target depth image and the depth data of a corresponding pixel in a predetermined background depth image; wherein the predetermined background depth image is an image of the background environment where the target object is located, which is captured in advance by the depth image capturing device and does not contain the target object;
generating a frame difference image corresponding to the target depth image based on the difference for each of the pixels;
binarizing the frame difference image; and
obtaining the target image region corresponding to the target object from the binarized frame difference image.

5. The method of claim 1, wherein determining a target circumscribed rectangle that corresponds to the target image region and meets a predetermined condition, comprises:
determining the target circumscribed rectangle that corresponds to the target image region and meets a predetermined condition by using a connected region analysis algorithm or an edge detection fitting algorithm.

6. A non-transitory storage medium for storing executable program codes, which are executed to carry out the method for determining volume of an object of claim 1.

7. An electronic device comprising: a housing, a processor, a memory, a circuit board, and a power circuit; wherein the circuit board is arranged inside a space surrounded by the housing; the processor and the memory are arranged on the circuit board; the power circuit is used for supplying power to various circuits or components; the memory is used for storing executable program codes; and the processor carries out the method for determining volume of an object of claim 1 by executing the executable program codes stored in the memory.

8. An apparatus for determining volume of an object, comprising:
a depth image obtaining module, configured for obtaining a target depth image containing a target object which is captured by a depth image capturing device;
an image region segmentation module, configured for performing segmentation based on depth data in the target depth image to obtain a target image region corresponding to the target object;
a circumscribed rectangle determination module, configured for determining a target circumscribed rectangle that corresponds to the target image region and meets a predetermined condition, which comprises: determining a target circumscribed rectangle that corresponds to the target image region and has a minimum area, or, determining a target circumscribed rectangle that corresponds to the target image region and has a minimum difference between its area and a predetermined area threshold;

extracting image coordinates of each vertex of the target circumscribed rectangle in a binarized frame difference image, wherein the frame difference image is an image that is obtained based on the difference between the depth data of the target depth image and depth data of a predetermined background depth image, projecting the extracted image coordinates of each vertex into the target depth image to generate a reference point located in the target depth image;

calculating three-dimensional coordinates for each reference point in a camera world coordinate system according to a principle of perspective projection in camera imaging; and with the three-dimensional coordinates of the reference points, calculating Euclidean distance between every two of the reference points, determining a length and a width of the target object as two distances other than the longest distance in the calculated Euclidean distances, subtracting a depth value of a region corresponding to the reference points from a depth value of the predetermined background depth image to obtain a height of the target object, and determining a volume of the target object as the product of the length, width and height of the target object.

9. The apparatus of claim 8, wherein the depth image obtaining module comprises:

a depth image obtaining unit, configured for obtaining the target depth image containing the target object which is captured by a time-of-flight camera.

10. The apparatus of claim 8, wherein the image region segmentation module comprises:

an image region segmentation unit, configured for performing segmentation based on the depth data in the target depth image using a depth image frame difference method to obtain the target image region corresponding to the target object.

11. The apparatus of claim 10, wherein the image region segmentation unit comprises:

a subtraction sub-unit, configured for obtaining a difference between the depth data of each of pixels in the target depth image and the depth data of a corresponding pixel in a predetermined background depth image; wherein the predetermined background depth image is an image of the background environment where the target object is located, which is captured in advance by the depth image capturing device and does not contain the target object;

a frame difference image generating sub-unit, configured for generating a frame difference image corresponding to the target depth image based on the difference for each of the pixels;

a binarization sub-unit, configured for binarizing the frame difference image; and an image region segmentation sub-unit, configured for obtaining the target image region corresponding to the target object from the binarized frame difference image.

12. The apparatus of claim 8, wherein the circumscribed rectangle determination module comprises:

a first circumscribed rectangle determination unit, configured for determining the target circumscribed rectangle that corresponds to the target image region and meets a predetermined condition by using a connected region analysis algorithm or an edge detection fitting algorithm.

* * * * *